May 24, 1960 S. GOLTEN 2,937,908
BEARINGS
Filed June 14, 1957 2 Sheets-Sheet 1

INVENTOR.
SIGURD GOLTEN
BY Edwin S. Hall
ATTORNEY

May 24, 1960

S. GOLTEN 2,937,908

BEARINGS

Filed June 14, 1957

*INVENTOR.*
SIGURD GOLTEN

BY

*Edwin S. Hall*

ATTORNEY.

United States Patent Office 2,937,908
Patented May 24, 1960

2,937,908

BEARINGS

Sigurd Golten, 455 Carroll St., Brooklyn, N.Y.

Filed June 14, 1957, Ser. No. 665,698

2 Claims. (Cl. 308—122)

This invention relates to bearings. An object of the invention is to provide improved structure and method for insuring continuous fluid-film lubrication between relatively moving parts of journal and thrust bearings. While especially advantageous in heavily loaded oscillating bearings where the load is always in the same direction, for example, wristpin bearings in single-acting two-stroke diesel engines, the invention is applicable to journal and thrust bearings in general.

To distribute oil to loaded areas in bearings, it is common practice to provide oil grooves cut in the bearing metal. These grooves remove part of the bearing area, weaken the bearing, and tend to cause the relatively soft bearing metal to crack. Moreover, grooves formed in the bearing sometimes interfere with, rather than promote, oil-wedge fluid-film lubrication between the journal or flange and the cylindrical or plane bearing respectively. In a simple collar-type thrust bearing, attempts to induce oil to wedge in between plane surfaces by providing grooves in the bearing have failed, necessitating the use of Kingsbury or Michell pivoted slippers to insure oil-wedge fluid-film lubrication.

I have discovered that oil tends to stick to bearing metal more than to steel. An object of this invention is to take advantage of that fact, insure the continuous supply of oil to the entire bearing surface and facilitate continuous fluid-film lubrication between the relatively moving parts, by providing oil grooves in the steel parts (the journal in a journal bearing or the flange in a thrust bearing), rather than in the bearing metal, leaving the bearing metal surfaces intact.

Other objects are to provide a simple bearing and oil channel structure, adaptable both to journal bearings and to thrust bearings, practical, efficient, durable, and easy to manufacture.

Briefly described, the invention consists of providing oil distributing channels in the steel parts rather than in the bearing metal. In a journal bearing, oil grooves or flats are formed in the journal, leaving the cylindrical bearing intact. In a thrust bearing, oil-distributing grooves are formed in the shaft flange, leaving the plane bearing surfaces intact.

The invention and its objects will be readily understood from the following description in connection with the drawings in which.

Figure 1:
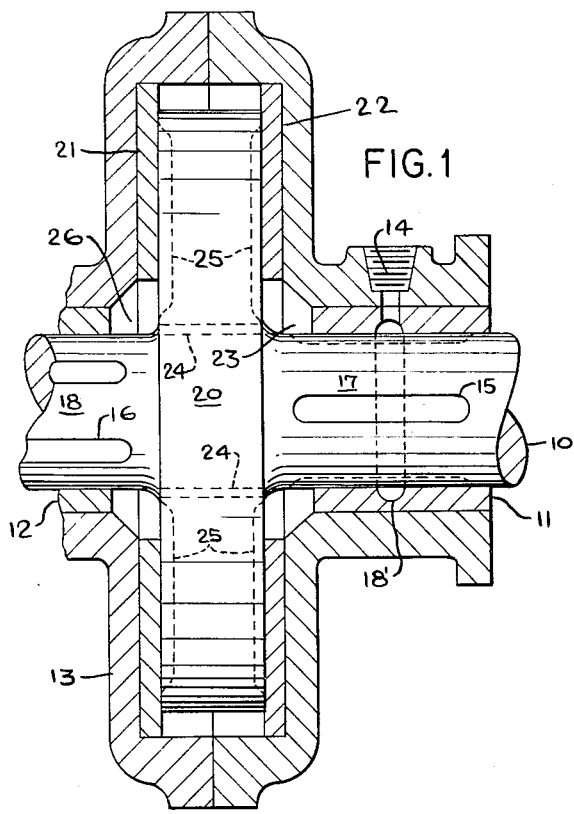
Fig. 1 is a longitudinal section of the invention as applied in a thrust bearing and in a journal bearing.
Figure 2:
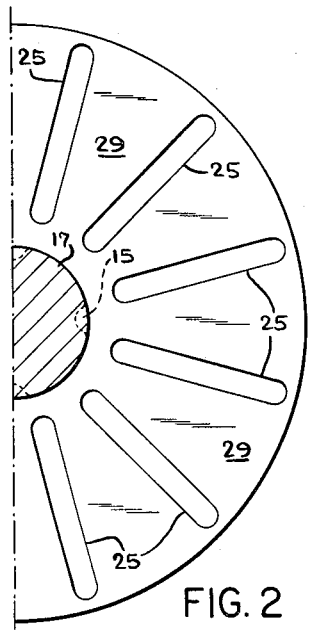
Fig. 2 is an end view of the shaft and flange of Fig. 1.

Referring to the drawings, shaft 10 is operable in journal bearings 11 and 12 in casing 13. Flange 20 is carried by shaft 10 and operates between bearing metal discs 21 and 22 in casing 13. Shaft 10 is provided with oil channels 15 and 16 formed in journals 17 and 18. Shaft flange 20 is provided with oil grooves 25.

In operation oil is supplied to the bearings thru conduit 14 and annular groove 18 to grooves 15, annular space 23, grooves 25 in flange 20, and thru holes 24 to annular space 26 to flats 16 in journal 18. The edges of grooves 15, flats 16, and grooves 25 are rounded to facilitate entry of oil between the relatively moving surfaces. In the journal bearing the arc of the journal between two grooves 15 becomes an effective "slipper" riding on the oil which adheres to the bearing metal surface of bearing 11. In the thrust bearing sector 29 between two grooves 25 becomes an effective "slipper" riding on the oil which adheres to the bearing metal surface of disc 22; centrifugal action on the oil in grooves 25 assists in providing fluid-film lubrication.

Figure 3:
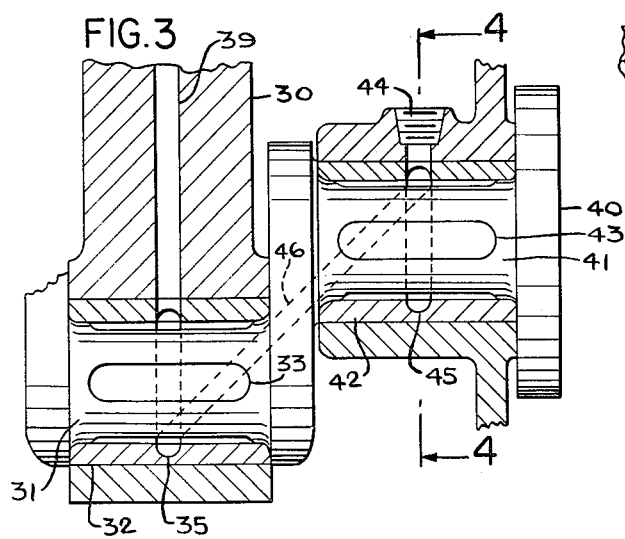
Fig. 3 is a sectional view showing the invention applied to main and crankpin bearings of a crankshaft.
Figure 4:
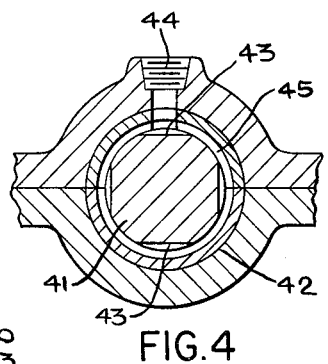
Fig. 4 is a transverse section on the line 4—4 of Fig. 3.

Referring to Figs. 3 and 4, main journal 41 of crankshaft 40 is operable in main bearing 42. Crankpin 31 is operable in connecting rod bearing 32. Main journal 41 is provided with longitudinal flats 32 and crankpin 31 is provided with flats 33. Flats 43 and 33 form, with their respective bearings, segmental oil channels for distributing oil to the interior surfaces of bearings 42 and 32.

Oil is supplied through conduit 44 to circumferential oil groove 45 formed in bearing 42. Oil groove 45 distributes oil to flats 43. Oil flows from groove 45 through hole 46, drilled in crankshaft 40, to oil groove 35 in bearing 32. Oil groove 35 distributes oil to flats 33 and to conduit 39 in connecting rod 30.

In operation, the cylindrical arcs of journals 41 and 31, between adjacent grooves 43 and 33, form effective "slippers" riding on oil adhering to bearings 42 and 32, providing fluid-film lubricating between the relatively moving parts.

Figure 7:
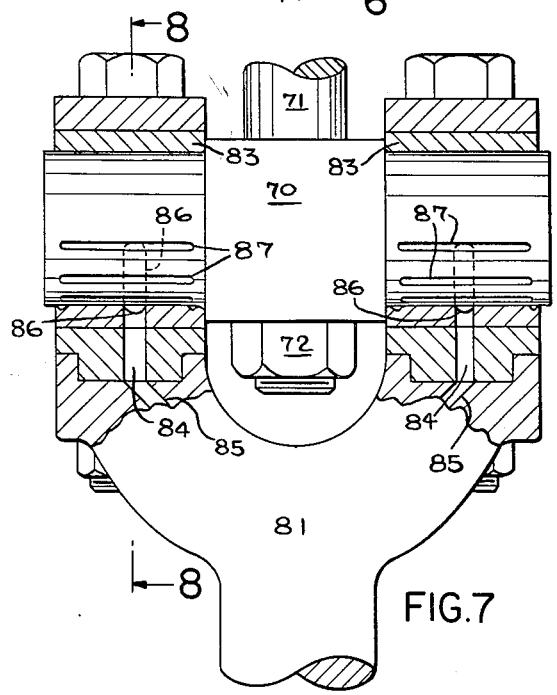
Fig. 7 is a sectional view of a wristpin bearing as used in the crosshead of a single-acting two-stroke diesel engine, taken on the line 7—7 of Fig. 8.
Figure 8:
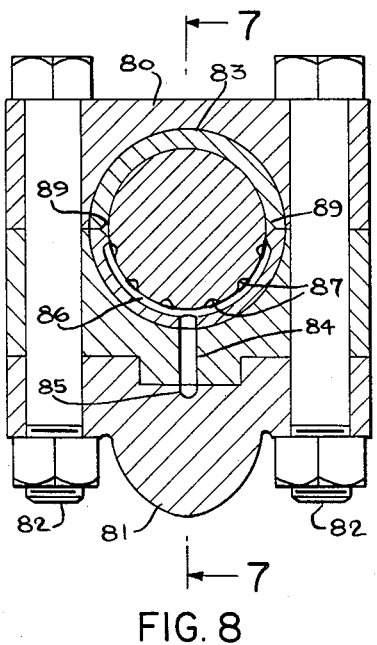
Fig. 8 is a sectional view taken on the line 8—8 of Fig. 7.
Figure 9:
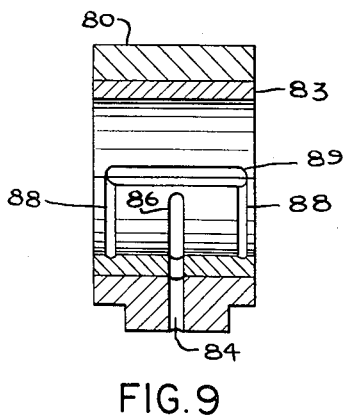
Fig. 9 is a sectional view of a wristpin bearing taken on the line 7—7 of Fig. 8.

Referring to Figs. 7, 8, and 9, wristpin 70 is fastened to piston rod 71 in any convenient manner as by knot 72. Bearing assemblies 80 are bolted to connecting rod 81 by bolts 82. Bearing assemblies 80 are provided with bearings 83 rockable on wristpin 70.

Figure 5:
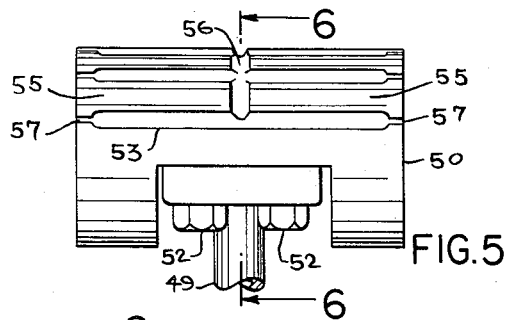
Fig. 5 is a side view of a wristpin for a trunk piston in a well-known type of single-acting diesel engine.
Figure 6:
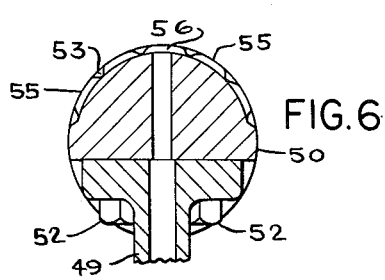
Fig. 6 is a sectional view taken on the line 6—6 of Fig. 5.

Bearing assembly 80 is provided with an oil supply hole 84 leading from conduit 85 in connecting rod 81, to deliver oil to groove 86 which may be formed either in the bearing as shown in Figs. 7, 8, and 9, or in the wristpin as shown in Figs. 5 and 6.

Wristpin 70 is provided with oil grooves 87 spaced apart an angle less than the rocking angle of the connecting rod bearings relative to the wristpin. The edges of grooves 87 are rounded to facilitate entry of oil between wristpin 70 and bearings 83. In operation, as bearings 83 rock relative to wristpin 70, oil in grooves 87 sweeps the entire loaded area of bearings 83. The areas of wristpin 70 between grooves 87 ride as "slippers" on the oil adhering to the bearing metal of bearings 83, and provide fluid-film lubrication.

Oil grooves 87 bleed into arcuate grooves 88 which, in turn, bleed into bevels 89. Thus the possibility of air locks or accumulations of dirt in the ends of grooves 87 is prevented.

Referring to Figs. 5 and 6, wristpin 50 is of well-known structure for a single-acting trunk-piston diesel engine. Wristpin 50 is secured to connecting rod 49 by screws 52.

Wristpin 50 is provided with longitudinal oil grooves 53 and an arcuate oil groove 56. Oil enters wristpin 50 from conduit 39 in the connecting rod, and flows through arcuate grooves 56 to grooves 53. Bleed holes or grooves 57 are provided to avoid any possibility of dead ends in grooves 53. In operation, as wristpin 50 rocks in its bearings in the piston, oil grooves 53 sweep the entire loaded area of the wristpin bearings. The cylindrical arcs 55 between grooves 53 ride as "slippers" on the oil adhering to the wristpin bearings. Thus fluid-film lubrication is provided, insuring freedom from metal-to-metal contact and long life.

Having thus described the invention, it is clear that the objects stated have been attained in a practical manner. While particular embodiments of the invention have been shown and described, it is understood that changes in the construction and in the operation of the invention may be made without departing from the spirit and scope of the invention as expressed in the following claims.

I claim:

1. In a journal bearing assembly, a cylindrical bearing formed of bearing metal, a shaft having a journal formed of hard metal operably conforming to said bearing, oil-distributing channels formed longitudinally in said journal, said channels distributing oil to all parts of the surface of said cylindrical bearing, and an annular passage around said journal connected with and feeding oil into all of said oil-distributing channels, the portions of said journal which lie between any two of said oil-distributing channels forming effective slippers riding on oil films adhering to the bearing-metal surfaces of said cylindrical bearing.

2. In a bearing assembly, a cylindrical bearing formed of soft metal, a journal formed of hard metal and operable in said soft metal bearing, longitudinal flats on said journal forming segmental oil channels with the cylindrical interior of said bearing, and a circumferential oil conduit about said journal and supplying oil to all of said longitudinal channels.

References Cited in the file of this patent

UNITED STATES PATENTS

| | | |
|---|---|---|
| 1,292,312 | Gronkwist | Jan. 21, 1919 |
| 1,745,871 | Spillmann | Feb. 4, 1930 |
| 2,005,028 | Eynon | June 18, 1935 |
| 2,014,160 | Bary | Sept. 10, 1935 |
| 2,069,594 | Schneider | Feb. 2, 1937 |
| 2,389,687 | Rickenmann | Nov. 27, 1945 |

FOREIGN PATENTS

| | | |
|---|---|---|
| 242,769 | Great Britain | Nov. 19, 1925 |
| 380,660 | Great Britain | Sept. 22, 1932 |